(12) United States Patent
Bergkamp et al.

(10) Patent No.: US 6,385,952 B1
(45) Date of Patent: May 14, 2002

(54) IN-LINE RECTANGULAR BALER HAVING IMPROVED DUAL PURPOSE STUFFER

(75) Inventors: Alan R. Bergkamp, Galva; Edward Wesley Esau, Hesston, both of KS (US)

(73) Assignee: Agco Corporation, Hesston, KS (US)

( * ) Notice: Subject to any disclaimer, the term of this patent is extended or adjusted under 35 U.S.C. 154(b) by 21 days.

(21) Appl. No.: 09/729,488

(22) Filed: Dec. 4, 2000

(51) Int. Cl.$^7$ ............................................. A01D 39/00
(52) U.S. Cl. ........................................ 56/341; 100/189
(58) Field of Search .................... 56/341, 438, 440, 56/443, 446, 455, 344; 100/88, 179, 189, 240

(56) References Cited

U.S. PATENT DOCUMENTS

| | | | |
|---|---|---|---|
| 4,132,164 A | * | 1/1979 | White .......................... 100/189 |
| 4,524,574 A | * | 6/1985 | Ratzlaff ........................ 56/341 |
| 4,525,991 A | * | 7/1985 | Naaktgeboren .............. 56/341 |
| 4,751,810 A | * | 6/1988 | Naaktgeboren et al. ....... 56/341 |
| 4,782,651 A | * | 11/1988 | Ratzlaff ........................ 56/341 |
| 4,928,462 A | * | 5/1990 | Lippens et al. ............... 56/341 |
| 5,842,335 A | | 12/1998 | Esau |

* cited by examiner

Primary Examiner—Robert E. Pezzuto

(74) Attorney, Agent, or Firm—Hovey Williams LLP

(57) ABSTRACT

A square baler has a generally horizontally disposed baling chamber, a reciprocating plunger within the chamber, and an underslung loading duct projecting downwardly and forwardly from the bottom of the chamber to a pickup apparatus. A stuffer is operable through successive stuffing strokes within the duct to both transfer material from the pickup apparatus into the baling chamber and precompress the material within the duct. The stuffer includes a pair of fore-and-aft mutually spaced apart forks presenting a leading fork and a trailing fork with respect to the direction of travel of the stuffer during a stuffing stroke. The leading fork has a generally kidney-shaped path of travel that begins its upstroke rearwardly of the forwardly facing inlet of the duct, while the trailing fork has a generally kidney-shaped path of travel that begins its upstroke forwardly of the inlet of the duct. The stuffer is operable in timed relationship with the plunger so that the leading fork precompresses a charge of material against the bottom of the plunger as it is retracting and then stuffs the precompressed charge into the chamber when the plunger is sufficiently retracted. The trailing fork, on the other hand, sweeps new material into the inlet of the duct and advances it up to the bottom of the plunger path of travel as the leading fork carries out and completes its stuffing stroke. The trailing fork is narrower than the leading fork, providing room for center-gathering stub augers to deliver materials from the pickup to an inboard position generally under the center prongs of the trailing fork.

6 Claims, 4 Drawing Sheets

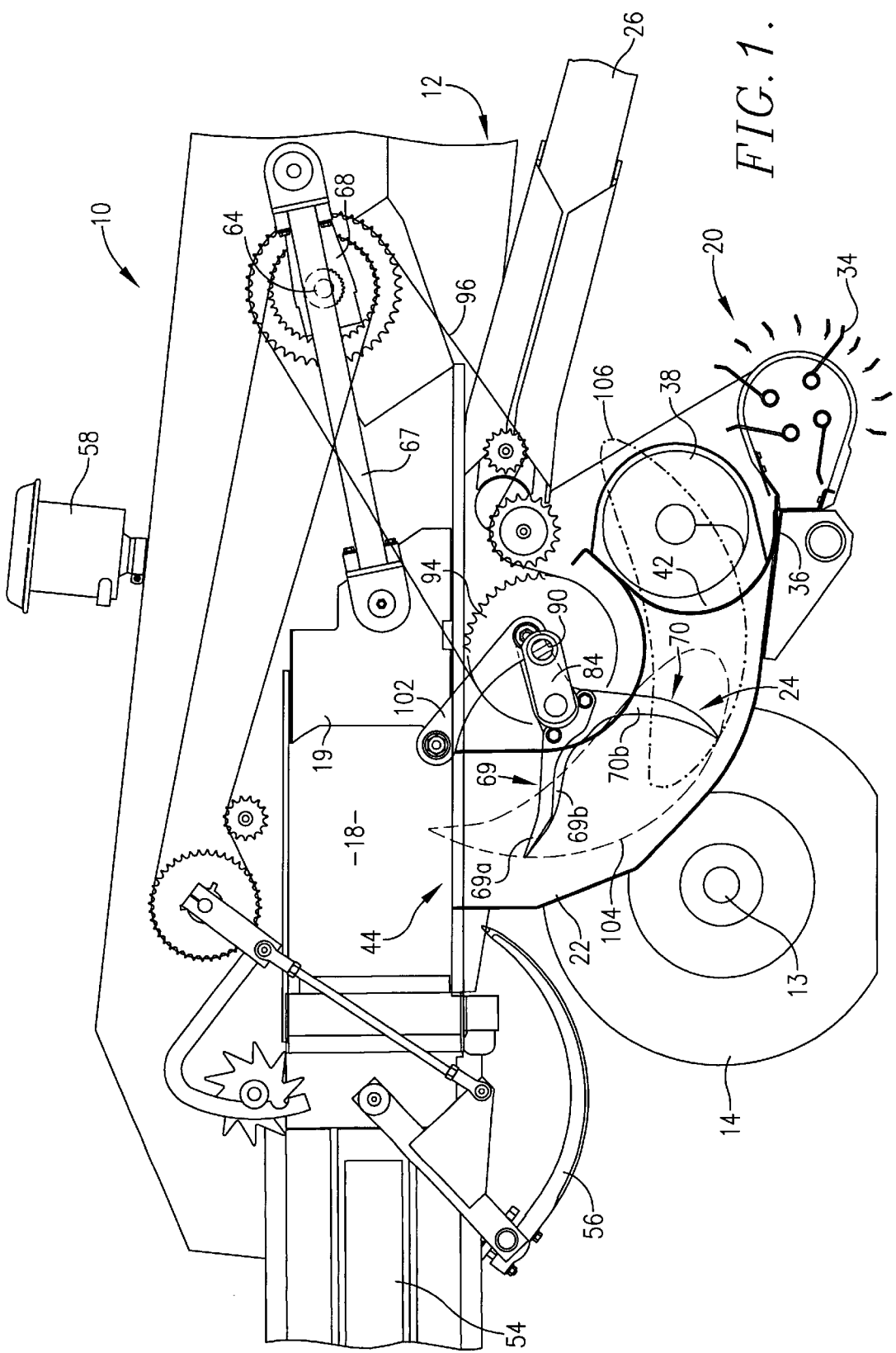

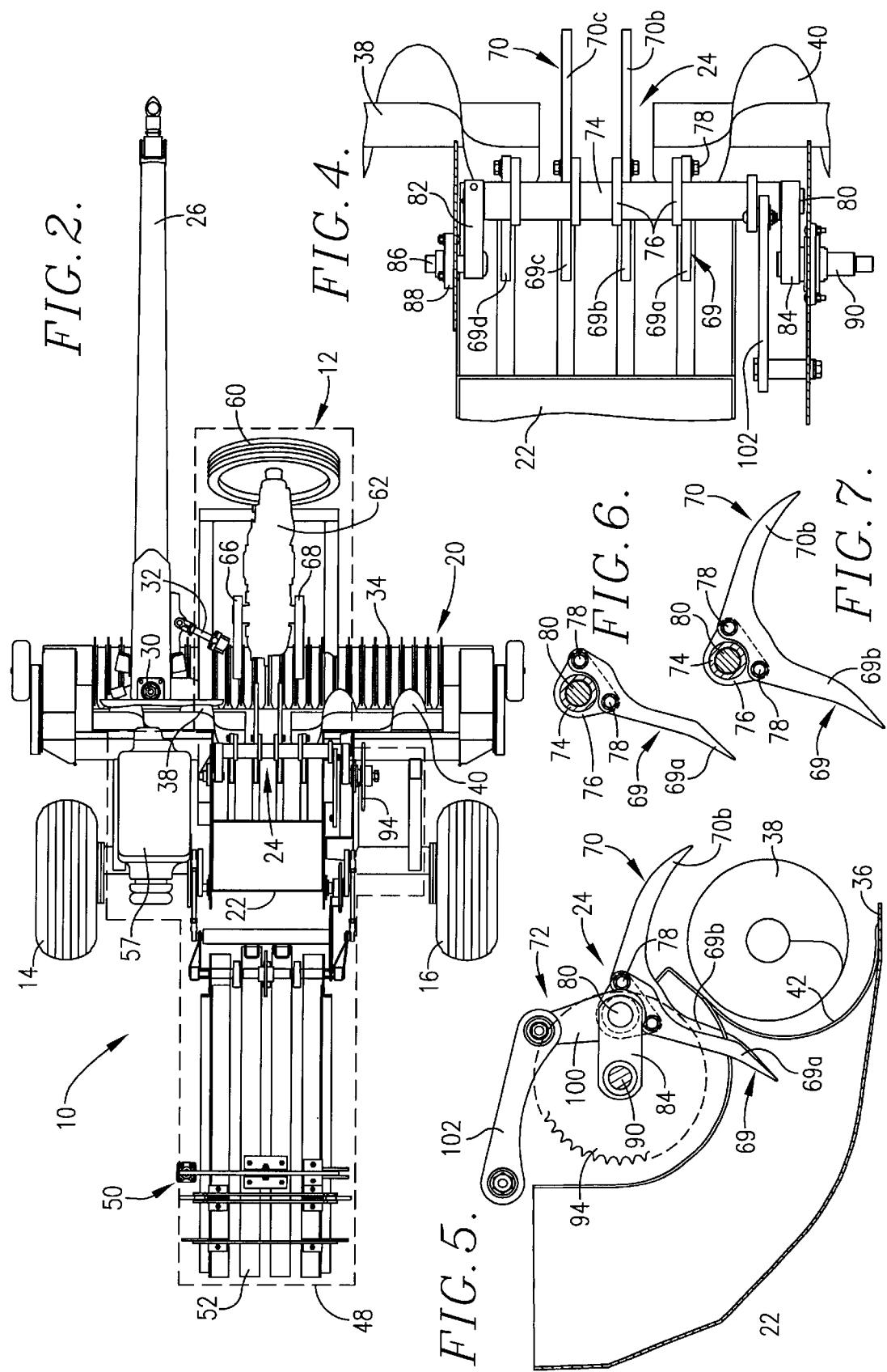

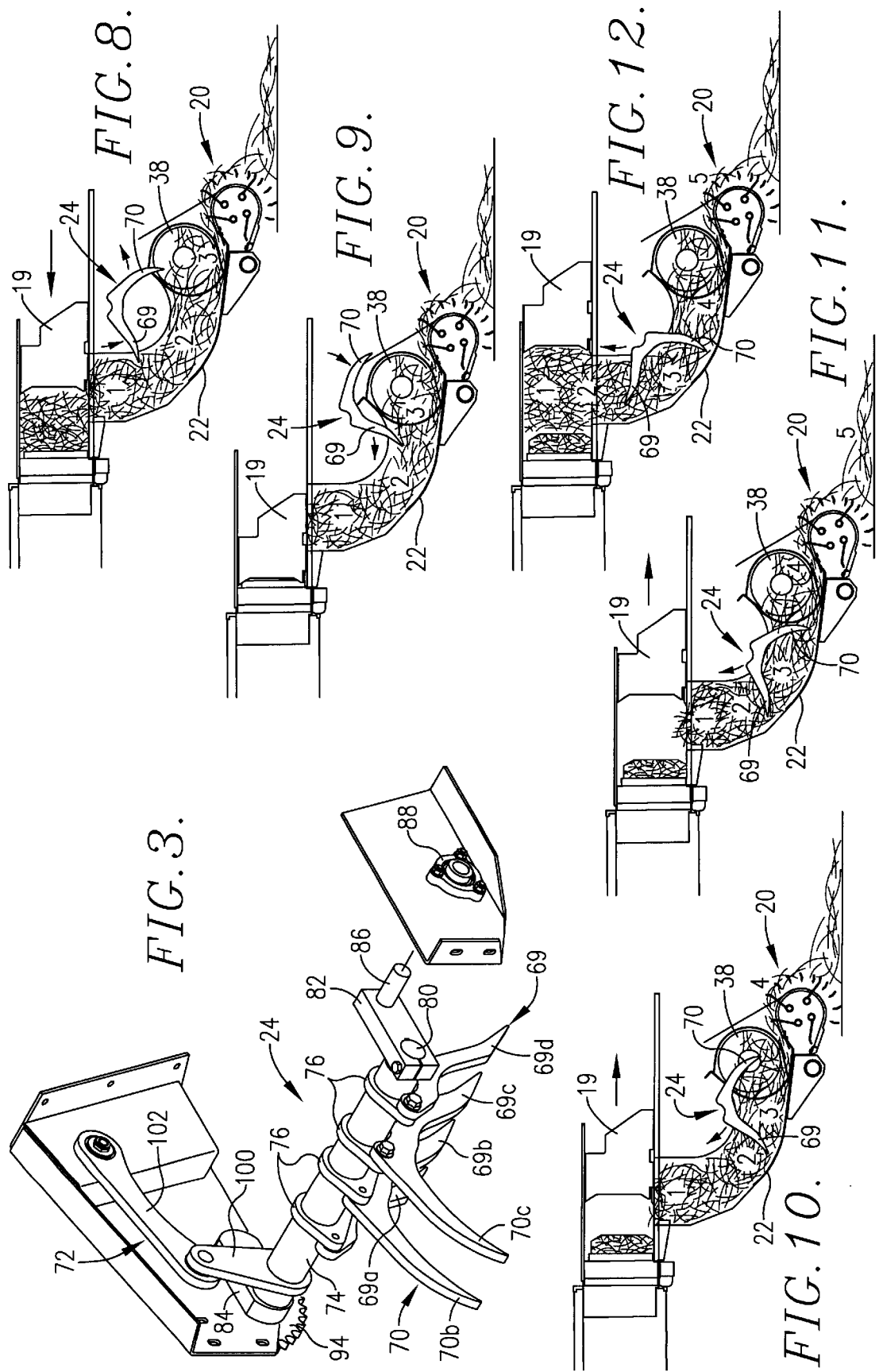

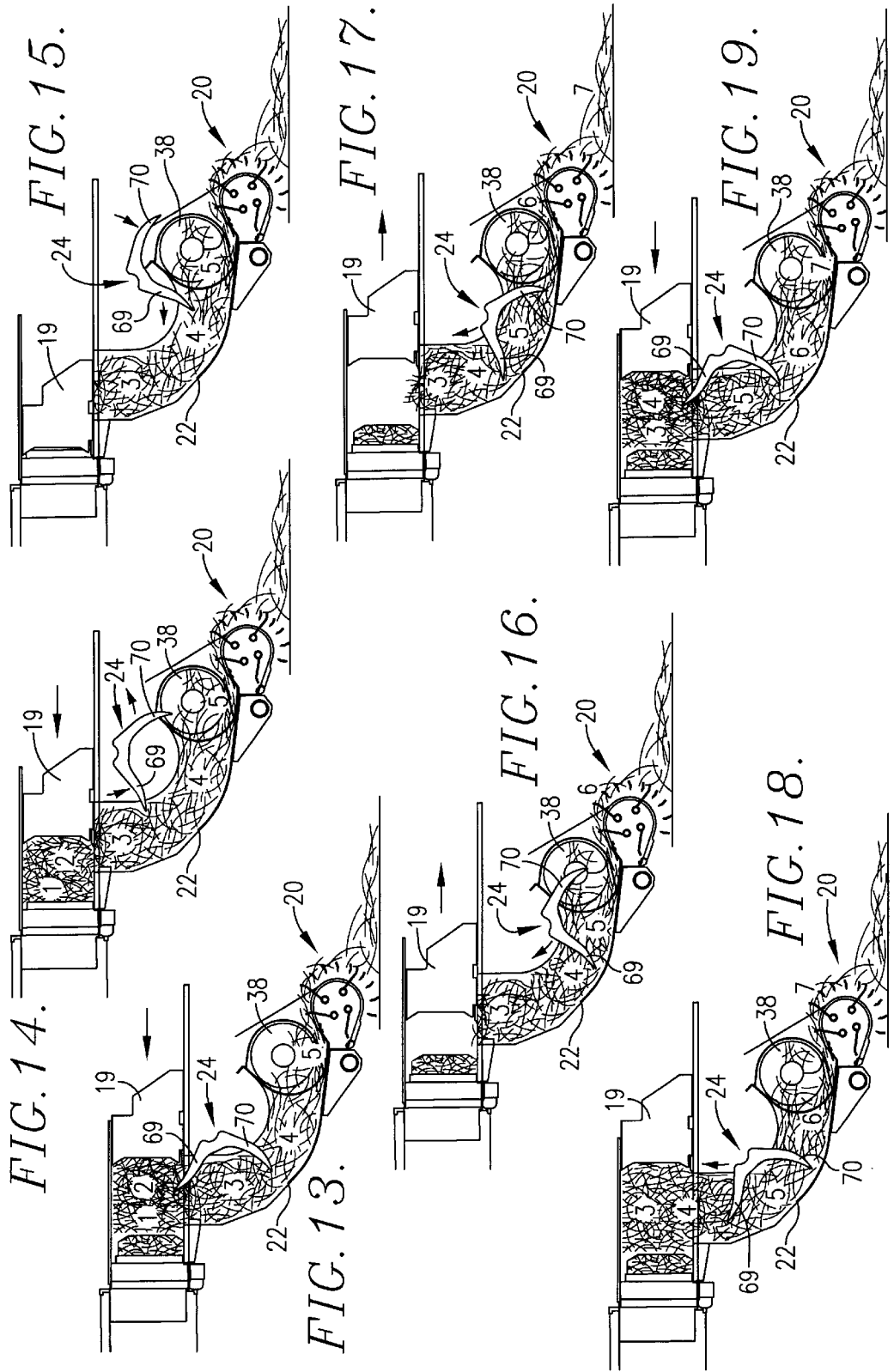

IN-LINE RECTANGULAR BALER HAVING IMPROVED DUAL PURPOSE STUFFER

TECHNICAL FIELD

The present invention relates generally to "square" or "rectangular" crop balers having a generally horizontally disposed baling chamber, a reciprocating plunger within the chamber, and an in-line, underslung loading duct projecting downwardly and forwardly from the bottom of the chamber to a crop pickup apparatus. More particularly, the invention concerns improvements in a stuffer operable within the duct for transferring crop material from the pickup apparatus to the baling chamber.

BACKGROUND

In U.S. Pat. No. 5,842,335 assigned to the assignee of the present invention there is disclosed and claimed an in-line baler in which the stuffer performs the dual purpose of both precompressing charges in the loading duct and stuffing such charges into the baling chamber. While such stuffer has performed well in a variety of crop conditions, in some conditions more than others there is a tendency for the baler to produce bales that are softer in the lower central areas of the bale and firmer in the upper corners, rather than uniformly dense throughout the cross-section of the bale.

SUMMARY OF THE INVENTION

Accordingly, the primary object of the present invention is to improve upon the dual-purpose stuffing concepts of the '335 Patent by consistently providing more uniform density across the entire cross-sectional area of the bale. The present invention continues the concept of providing the stuffer with a pair of fore-and-aft mutually spaced apart forks presenting a leading fork and a trailing fork with respect to the direction of travel of the stuffer during a stuffer stroke. The leading fork has a generally kidney-shaped path of travel that begins rearwardly of the forwardly facing inlet of the duct, while the trailing fork has a generally kidney-shaped path of travel that begins forwardly of the duct inlet. Accordingly, the leading fork precompresses the charge against the bottom of the plunger as the plunger is covering the open end of the duct and then stuffs the precompressed charge into the chamber when the plunger is sufficiently retracted. The trailing fork, on the other hand, sweeps new material into the inlet of the duct and advances it at least to the beginning of the path of travel of the leading fork as the leading fork carries out and completes its stuffing stroke. However, in accordance with the present invention, the leading fork is wider than the trailing fork, rather than the same width as in the stuffer of the '335 Patent. This allows extra room in front of the inlet of the duct for center-gathering stub augers to move additional material further to the lateral center than in the prior are design and results in more uniform density across the cross-section of the bale.

In the preferred embodiment, the prongs on both the leading and trailing forks are all equally spaced apart and in fore-and-aft alignment. However, there are four prongs on the leading fork and only two prongs on the trailing fork.

BRIEF DESCRIPTION OF THE DRAWING FIGURES

FIG. 1 is a fragmentary, somewhat schematic, side elevational view of a square baler with portions thereof being removed to reveal internal details of construction, particularly illustrating a stuffer constructed in accordance with the present invention and the paths of travel of the leading and trailing forks of the stuffer;

FIG. 2 is a schematic top plan view of the baler illustrated in FIG. 1;

FIG. 3 is an enlarged, exploded perspective view of the stuffer and drive mechanism therefor, particularly illustrating the components of the drive mechanism for controlling the movement of the stuffer such that the forks have respective kidney-shaped paths of travel.

FIG. 4 is an enlarged top plan view of just the stuffer, its drive mechanism, and the center-gathering stub augers;

FIG. 5 is an enlarged, schematic side elevational view of the stuffer, drive mechanism, loading duct and stub augers;

FIG. 6 is a transverse cross-sectional view of the stuffer adjacent one of the outer prong elements illustrating the absence of a trailing prong on the rear fork;

FIG. 7 is a transverse cross-sectional view of the stuffer adjacent one of the center prong elements illustrating the presence of both a leading and a trailing prong;

FIG. 8 is a fragmentary, schematic side elevational view of the baler, particularly illustrating the plunger as it moves rearwardly during its compaction stroke and the stuffer as it moves forwardly and downwardly during its return stroke;

FIG. 9 is a side elevational view similar to FIG. 8, but illustrating the plunger at its rearwardmost position just before its retraction stroke and the stuffer at the beginning of the stuffing stroke with the leading fork positioned rearwardly of the duct inlet and the trailing fork positioned forwardly of the duct inlet;

FIG. 10 is a side elevational view similar to FIG. 9, but illustrating the plunger as it moves forwardly during its retraction stroke and the stuffer as it moves rearwardly and upwardly during its stuffing stroke so that the leading fork packs material masses 1 and 2 against the bottom of the forwardly moving plunger and the trailing fork moves material mass 3 through the duct;

FIG. 11 is a side elevational view similar to FIG. 10, but illustrating the plunger moved forwardly relative to FIG. 10 and the stuffer moved further along its stuffing stroke so that the leading fork further packs material masses 1 and 2 against the bottom of the plunger and the trailing fork continues to move the material mass 3 through the duct;

FIG. 12 is a side elevational view similar to FIG. 11, but illustrating the plunger in its forwardmost position and the stuffer further along its stuffing stroke so that the leading fork stuffs material masses 1 and 2 into the baling chamber and the trailing fork continues to move material mass 3 through the duct;

FIG. 13 is a side elevational view similar to FIG. 12, but illustrating the plunger at the beginning of its compaction stroke and the stuffer at the end of its stuffing stroke, whereby the leading fork projects slightly into the baling chamber to further precompress material masses 1 and 2 and the trailing fork has moved the material mass 3 to a position adjacent the duct outlet;

FIG. 14 is a side elevational view similar to FIG. 8, with the plunger compacting material masses 1 and 2 within the baling chamber;

FIG. 15 is a side elevational view similar to FIG. 9, but illustrating material masses 3, 4 and 5 within the loading duct;

FIG. 16 is a side elevational view similar to FIG. 10, with the leading fork packing material masses 3 and 4 against the bottom of the plunger and the trailing fork moving material mass 5 through the duct;

FIG. 17 is a side elevational view similar to FIG. 11, with the leading fork further packing material masses 3 and 4 against the bottom of the plunger and the trailing fork continuing to move material mass 5 through the duct;

FIG. 18 is a side elevational view similar to FIG. 12, with material masses 3 and 4 being stuffed into the baling chamber by the leading fork; and FIG. 19 is a side elevational view similar to FIG. 13, with material masses 3 and 4 within the baling chamber and material mass 5 adjacent the chamber inlet.

DETAILED DESCRIPTION OF THE PREFERRED EMBODIMENT

The baler 10 selected for illustration has a wheeled chassis 12 including an axle 13 and a pair of laterally spaced ground wheels 14 and 16. The chassis 12 carries a substantially horizontal, fore-and-aft extending baling chamber 18 that is centered between the two wheels 14,16 (see FIG. 2). As will subsequently be described, a plunger 19 reciprocates in a fore-and-aft direction within the baling chamber 18 for compacting crop material into a bale. A windrow pickup, generally designated by the numeral 20, is supported on the chassis 12 below the baling chamber 18, in front of the wheels 14,16, and centered along the fore-and-aft axis of the baler for picking up a windrow of crop material as the baler is advanced along a path of travel by a towing vehicle (not shown). A loading duct 22 extends generally between the pickup apparatus 20 and the baling chamber 18 and contains a stuffer, generally designated by the numeral 24, constructed in accordance with the principles of the present invention (see FIG. 1). As will be described hereinbelow, the stuffer 24 transfers crop material from the pickup apparatus to the baling chamber and precompresses the material within the duct prior to stuffing it into the chamber.

Accordingly, the illustrated baler is a so-called "in-line" square baler with the baling chamber 18, plunger 19, loading duct 22 and crop pickup apparatus 20 located along the same longitudinal, fore-and-aft axis. However, the principles of the present invention are equally applicable to various other square and rectangular baler designs. For example, it is entirely within the ambit of the present invention to utilize the inventive stuffer 24 on a square baler having a pick up apparatus offset from the baling chamber.

With the foregoing caveat in mind, a tongue 26 extends from the front of the baler 10 to connect the baler to the towing vehicle. The forward end of the tongue 26 has a hitch 28 for connection to the towing vehicle, while the rearward end of the tongue is pivotally connected to the chassis 12 for movement about a generally upright pivot 30 (see FIG. 2). It will be appreciated that the pivot 30 enables the tongue 26 to swing back-and-forth in a generally horizontal plane so that the baler may be positioned either directly behind the towing vehicle or at a position offset relative to the vehicle. A hydraulic swing cylinder 32 pivotally connected between tongue 26 and chassis 12 is provided for swinging the tongue and thereby shifting the baler between its aligned and offset positions. See also U.S. Pat. No. 6,000,206.

As the baler is pulled along its path of travel by the towing vehicle, the pickup 20 picks up the windrow of crop material. Particularly, a plurality of laterally spaced tines 34 are driven along an upwardly and rearwardly extending path to transfer crop material from the ground to a laterally extending pan 36 (see FIG. 1). As perhaps best shown in FIG. 2, the pickup extends outwardly in opposite directions beyond the lateral confines of the duct 22. A pair of center-gathering stub augers 38 and 40 are provided on opposite sides of the pickup 20 to convey crop material from the outer, lateral reaches of the apparatus to the center of the machine in alignment with the duct 22.

The converged flow of crop material is subsequently transferred through the duct 22 by the stuffer 24, as will be described hereinbelow. The duct has a generally square cross-sectional configuration and curves generally rearwardly and upwardly from the pickup apparatus 20 to the baling chamber 18. The duct 22 is at least as long as the chamber 18 is tall, and preferably is on the order of twice the height of the chamber. The duct 22 is open at both ends to present a forwardly facing inlet 42 immediately rearward of the pan 36 of the pickup 20. The other end of the duct 22 presents an outlet which cooperates with an opening in the floor of the baling chamber 18 to define a crop material passageway, generally designated by the numeral 44, intercommunicating the duct and chamber.

The compacting plunger 19 is reciprocated within the baling chamber so that each new charge of the crop material stuffed through the passageway 44 is compacted rearwardly by the plunger 19 during its compaction stroke. During such compaction stroke, the plunger 19 moves rearwardly, as indicated by the leftwardly pointing arrow in FIG. 8, across the top of the duct 22 to close off the passageway 44. At full compression it is disposed slightly beyond the rear edge of the passageway 44 (see FIG. 9). On the other hand, when fully retracted, the plunger 19 has withdrawn slightly beyond the opposite, forward edge of the passageway 44, as shown in FIG. 12. Each charge of new hay in the baling chamber 18 is packed rearwardly by the plunger 19 against a body of previously compacted hay. Thus, the previously compacted materials provide a backstop for each freshly compacted charge, and the total compacted mass within the chamber 18 is inched rearwardly toward a rearmost discharge outlet 48 with each compaction stroke of the plunger.

As shown in FIG. 2, a hydraulically controlled squeezed mechanism, broadly denoted by the numeral 50, controls the size of the outlet 48 and the side squeeze or pressure applied on the mass of materials between the outlet and the rear face of the plunger 19. The squeeze mechanism 50 applies inwardly directed squeeze force to an inwardly and outwardly moveable top rail 52 (see FIG. 2) and a pair of side rails 54 (only one such side rail being illustrated in FIG. 1). In its preferred form, the baler also has a bottom rail (not shown) that is moveable inwardly and outwardly with respect to the baling chamber for applying controllable amounts of squeeze pressure from the bottom of the machine so that pressure is actually applied from all four sides of the bale case. See also U.S. Pat. No. 5,735,199.

A suitable knotter and tying mechanism (not shown) is preferably provided for binding bales of the crop material before they issue from the outlet 48. Knotting needles 56 (see FIG. 1) suspended below the baling chamber 18 may comprise a part of such mechanism, as well understood by those skilled in the art.

As apparent from the foregoing description, the baler has numerous operating components that require driving power. These include the plunger 19, the pickup 20, the stuffer 24, the swing cylinder 32, the stub augers 38,40, the squeeze mechanism 50, and the knotter and knotting needles 56. Such driving power may be provided through a power take-off shaft (not shown) on the towing vehicle and a mechanical drive line (not shown) carried by the tongue 26. Alternatively, as contemplated by the illustrated embodiment, the source of driving power may be an onboard internal combustion engine and other apparatus all supported by the chassis 12 so that, except for certain controls, all of the operating and drive components for the baler are carried on the baler itself.

As shown in FIG. 2, an internal combustion engine 57 is mounted on the left side of the chassis forwardly of the wheel axle 13. The exhaust pipe 58 for the engine is shown in FIG. 1. The engine is drivingly connected to a hydraulic pump (not shown) which supplies oil under pressure to the various hydraulically powered components of the baler. Furthermore, the engine is drivingly coupled to a large flywheel sheave 60 connected to the front end of a gear box 62 (see FIG. 2). The gear box 62, in turn, provides mechanical driving power for the plunger 19, pickup 20, stuffer 24, stub augers 38, 40, and the knotting mechanism and needles 58.

With respect to the plunger 19, the gear box 62 has a transverse output shaft 64 that fixedly carries a pair of laterally spaced cranks 66 and 68. A pair of connecting rods 67 (only one of such rods shown in FIG. 1) are pivotally connected between the plunger 19 and respective ones of the cranks 66,68 for transferring the generally circular movement of the cranks to reciprocation of the plunger.

Stuffer 24

As indicated above, during the stuffing stroke of the stuffer 24, crop material is both transferred from the pickup 20 to the baling chamber 18 and precompressed within the loading duct 22 prior to being transferred into the chamber. The stuffer 24 has a leading fork 69 and a spaced trailing fork 70 with respect to the direction of travel of the stuffer during the stuffing stroke. Leading fork 69 is wider than trailing fork 70, presenting a series of four side-by-side prongs 69a–d. Prongs 69a and 69d are outer prongs, while prongs 69b and 69c are center prongs. Trailing fork 70 has only two prongs, namely two center prongs 70b and 70c that are aligned fore-and-aft with leading center prongs 69b and 69c. In the preferred embodiment of the invention, center prongs 69b and 70b comprise integrally connected portions of a generally C-shaped prong element, as do center prongs 69c and 70c.

The prongs of both forks each have a generally concave leading face and a generally convex trailing face. Furthermore, the forks so spaced in a fore-and-aft direction that the distance between the forks 69 and 70 at the tips is approximately one-and-one-half times the height of the baling chamber 18.

As shown in FIG. 1, the forks 69 and 70 each have a generally kidney-shaped path of travel which is controlled by a drive mechanism broadly designated by the numeral 72 (see FIG. 3). Particularly, the stuffer is provided with a transverse mounting tube 74 to which a series of laterally spaced brackets 76 are attached. As shown in FIGS. 3, 6 and 7, the prongs of forks 69 and 70 are fastened to the corresponding brackets 76 by bolt assemblies 78. The mounting tube 74 is rockably received on a transverse shaft 80 which spans and is rigidly affixed at its opposite ends to a pair of crank arms 82 and 84. The right crank arm 82 (as viewed from the rear of the machine) has a transverse, outwardly extending stub shaft 86 fixed thereto which is in turn journaled by bearing assembly 88 for rotation about a transverse axis defined by the stub shaft 86. Likewise, the left crank arm 84 has its own transverse, outwardly extending stub shaft 90 (see FIGS. 4 and 5) fixed thereto which is in turn journaled by a bearing assembly (not shown) for rotation about an axis coinciding with that of stub shaft 90. The stub shaft 90 projects further outwardly than stub shaft 86 and has a drive sprocket 94 fixed thereto. An endless chain 96 entrains the drive sprocket 94 and a second sprocket 98 carried on the output shaft 64 of the gear box 62 for drivingly connecting the stuffer 24 to the engine 57.

The transverse shaft 80, and thereby the tube 74, are thus driven in a circular orbit about the aligned axes of the stub shafts 86,90 (in a clockwise direction viewing FIG. 5) when power is supplied to the stuffer 24 by the chain 96. However, the forks 69 and 70 travel along their kidney-shaped paths, rather than follow the circular path of the tube 74. This is accomplished by the presence of a crank 100 and a stiff link 102 which cooperatively control the movement of the forks 69, 70. The crank 100 is fixed to the mounting tube 74 and pivotally connected to one of the ends of the link 102. The other end of the link 102 is pivotally connected to the proximal side of the baling chamber 18 at a point spaced above and forewardly of the axes of the stub shafts 86,90. Accordingly, the link 102 limits the degree of movement of the crank 100 such that the forks 69, 70 move along their respective kidney-shaped paths.

As shown in FIG. 1, the path of the leading fork 69 (designated by the numeral 104) begins rearwardly of the duct inlet 42 and terminates within the baling chamber 18. The path of the trailing fork 70 (designed by the numeral 106), on the other hand, begins slightly forwardly of the stub augers 38,40 and extends into the duct 22 to overlap the path of the leading fork 70. Furthermore, the operation of the stuffer 24 is coordinated with the operation of the plunger 19 so that the stuffing strokes of the forks 69, 70 are generally concurrent with the retraction stroke of the plunger 19, while the return strokes of the forks are generally concurrent with the compaction stroke of the plunger. That is to say, as the plunger 19 moves forwardly during its retraction stroke, the forks 69, 70 move generally rearwardly and upwardly through the duct to transfer crop material into the baling chamber 18. As will be further described below, the timed relationship of the plunger 19 and stuffer 24 also allows the leading fork 69 to pack material against the bottom of the plunger during its retraction stroke to effect the desired precompression of the material within the duct 22. Additionally, the trailing fork 70 moves through a path that serves to sweep crop material from the pickup 20 and stub augers 38, 40 to the path of the leading fork 69 so that the leading fork does not have to sweep entirely through the duct 22 (i.e., from the pickup to the baling chamber).

Operation

As the baler 10 is pulled across the field by the towing vehicle (not shown) the baler is aligned with a windrow of crop material. If necessary, the baler 10 may be offset relative to the towing vehicle by actuating the swing cylinder 22 to swing the tongue 26 about the pivot 30. The upwardly and rearwardly moving tines 34 of the pickup 20 pick the crop material up off the ground and transfer it rearwardly to the pan 36. The stub augers 38,40, in turn, converge the picked up crop material laterally inwardly past the side edges of the duct inlet 42 to a position generally under the trailing fork 70.

The sequence of operation will now be described with the assumption that the baler 10 has been sufficiently towed across the field so that masses of crop material, designated by the numerals 1 and 2 in FIG. 8, are present within the loading duct 22. As shown in FIG. 8, the plunger 19 moves rearwardly during its compaction stroke (indicated by the arrow) to compact the crop material within the baling chamber 18 and move the material rearwardly through the bale case. During the compaction stroke of the plunger 19, the leading fork 69 and trailing fork 70 travel along their respective return strokes. The forks 69, 70 are disposed almost entirely outside the duct 22 during their return strokes so as to prevent backflow of the material masses 1 and 2 which would otherwise be caused by the forwardly and downwardly moving forks. As the plunger 19 moves rearwardly during its compaction stroke and the stuffer 24 moves generally forwardly and downwardly during its return stroke, a third mass of material, designated by the numeral 3, collects on the pan 36 between the augers 38,40.

FIG. 9 shows the plunger 19 at its rearwardmost position, with the bottom of the plunger extending substantially across the passageway 44 so as to block the flow of crop material from the duct 22 into the baling chamber 18. The stuffer 24 is illustrated at the beginning of its stuffing stroke so that the forks 69, 70 straddle the duct inlet 42.

As the stuffer 24 initially moves along its stuffing stroke, the forks 69, 70 are shifted rearwardly and progressively inserted into the duct 22 so that the leading fork 69 is positioned between material masses 2 and 3 and the trailing fork 70 is positioned forwardly of the mass 3 (see FIG. 10). Accordingly, the mass 3 is trapped between the forks 69, 70 to move with the stuffer during its stuffing stroke, while the masses 1 and 2 are located downstream from the leading fork 69 to be forced through the duct 22 by the leading fork 69. Although the plunger 19 retracts forwardly as the stuffer 24 begins its stuffing stroke, the passageway 44 remains blocked by the plunger 19 during a considerable portion of the stuffing stroke. Accordingly, the material masses 1 and 2 are pressed against the bottom of the plunger 19 by the upwardly moving leading fork 69 before being stuffed into the baling chamber 18. The timed relationship of the plunger 19 and the stuffer 24 thus causes precompression of the material masses 1 and 2 as the leading fork 69 moves through the duct 22 during its stuffing stroke and the plunger 19 blocks the passageway 44 (see FIGS. 10 and 11). As shown in FIG. 11, material mass 3 contained between the forks 69 and 70 moves through the duct 22 with the stuffer 24, while a new material mass 4 begins to collect on the pan 36.

It will be appreciated that the crop material has a fairly self-adhesive nature and clings together so that material mass 1 does not enter the baling chamber even though the bottom of the plunger 19 only partially blocks the passageway 44. However, once the plunger 19 has shifted sufficiently forward so that it no longer blocks the passageway 44, the leading fork 69 stuffs the precompressed charge of material comprising material masses 1 and 2 into the baling chamber 18, as shown in FIG. 12. It will be noted that the adhesiveness of the crop material and the action of the pickup tines, the auger flighting and the forwardly moving baler cooperate to introduce the material mass 4 into the duct inlet 42 as the stuffer moves through its stuffing stroke (compare FIGS. 11 and 12).

FIG. 13 illustrates the stuffer 24 at its upwardmost position just prior to beginning its return stroke. The leading fork 69 projects slightly through the passageway 44 and into the baling chamber 18 for further compressing masses 1 and 2 and ensuring that the material is fully loaded up against the top of the baling chamber. At this time, the mass 3 is located immediately below the passageway 44 (i.e., within the path of the leading fork 69 when it makes the subsequent stuffing stroke), the mass 4 has been introduced into the duct 22 and a new material mass 5 is accumulating on the pan 36.

Thereafter, the plunger 19 compacts the material masses 1 and 2, while the stuffer 24 moves along its return stroke, as shown in FIG. 14. FIGS. 14–19 illustrate the same sequence of events illustrated in FIGS. 8–13, with the material masses 3 and 4 being precompressed within the duct 22 and subsequently stuffed into the baling chamber 18, and material mass 5 being contained between the leading fork 69 and trailing fork 70.

By eliminating the two outboard prongs on the trailing fork 70, the stub augers 38, 40 can be lengthened beyond that possible in the '335 Patent, without causing interference between trailing fork 70 and the stub augers. Consequently, stub augers 38, 40 can deliver more material near the lateral center of the duct for ultimate disposition in the corresponding central region of the bale, helping to reduce the softness sometimes experienced at that location in prior bales. Moreover, the narrowness of trailing fork 70 compared to leading fork 69 seems to produce better folding into the center of the bale of strands of material that previously tended to drape over the outboard prongs and remain in the outer regions of the bale.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, the stuffer may comprise a pair of independently operable forks which move through the loading duct in a manner similar to the leading and trailing forks described hereinabove.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. In a bottom loading square baler of the type having a generally horizontally disposed baling chamber and an underslung loading duct projecting downwardly and forwardly from the bottom of the chamber in vertical alignment with the chamber, the improvement comprising:

an opening into the baling chamber at an upper end of the duct for admitting charges of crop material from the duct into the chamber;

a plunger reciprocable within said chamber back and forth across said opening through successive compaction and retraction strokes to temporarily close the opening and for compacting the charges admitted to the chamber and forcing them incrementally rearwardly toward a restricted outlet of the chamber to incrementally build a bale that is discharged from the baler through said outlet, said duct having a generally forwardly facing inlet at a lower end of the duct adapted to admit crop materials into the duct;

apparatus adjacent the lower end of the duct for picking up crop materials from the ground as the baler advances and for delivering the picked up materials into the inlet of the duct; and a stuffer operable through successive stuffing strokes in timed relationship with the reciprocating plunger for loading successive charges of crop material into the baling chamber during retraction strokes of the plunger, said stuffer being operable to sweep upwardly and rearwardly through the duct during each stuffing stroke and including a pair of fore-and-aft mutually spaced apart forks presenting a leading fork and a trailing fork with respect to the direction of travel of the stuffer during a stuffing stroke, said leading fork having a generally kidney-shaped path of travel that begins rearwardly of said inlet of the duct and said trailing fork having a generally kidney-shaped path of travel that begins forwardly of the inlet of the duct so that the leading fork can precompress the charge against the bottom of the plunger as it is retracting and then stuff the precompressed charge into the chamber when the plunger is sufficiently retracted, while the trailing fork can sweep new material into the inlet of the duct and advance it at least to the beginning of the path of travel of the leading fork as the leading fork carries out and completes its stuffing stroke, said leading fork being wider than said trailing fork.

2. In a bottom loading square baler as claimed in claim 1, each of said forks comprising a series of side-by-side, laterally spaced prongs, the prongs of the trailing fork being spaced apart the same distance as the prongs of the leading fork, said leading fork having more prongs than said trailing fork.

3. In a bottom loading square baler as claimed in claim 2, each series of prongs being centered with respect to the longitudinal center line of the duct as viewed in plan.

4. In a bottom loading square baler as claimed in claim 3, said apparatus including a pair of transversely spaced, axially aligned, center-gathering stub augers adjacent said inlet of the duct, said path of travel of the trailing fork intersecting with the common axis of rotation of the stub augers, said stub augers extending inwardly beyond the laterally outermost prongs of the leading fork but terminating short of the outermost prongs of the trailing fork.

5. In a bottom loading square baler as claimed in claim 1, said apparatus including a pair of transversely spaced, axially aligned, center-gathering stub augers adjacent said inlet of the duct, said path of travel of the trailing fork intersecting with the common axis of rotation of the stub augers, said stub augers extending inwardly beyond the opposite laterally outermost extremities of the leading fork but terminating short of the opposite laterally outermost extremities of the trailing fork.

6. In a bottom loading square baler as claimed in claim 5, each of said forks comprising a series of side-by-side, laterally spaced prongs, the prongs of the trailing fork being spaced apart the same distance as the prongs of the leading fork, said leading fork having more prongs than said trailing fork.

\* \* \* \* \*